United States Patent
Zamel et al.

(10) Patent No.: US 11,470,080 B2
(45) Date of Patent: Oct. 11, 2022

(54) METHOD FOR PERFORMING A BIOMETRIC FUNCTION BETWEEN A CLIENT AND A SERVER

(71) Applicant: Idemia Identity & Security France, Courbevoie (FR)

(72) Inventors: Ziad Zamel, Courbevoie (FR); Richard Mikhael, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 704 days.

(21) Appl. No.: 16/412,571

(22) Filed: May 15, 2019

(65) Prior Publication Data
US 2019/0356656 A1   Nov. 21, 2019

(30) Foreign Application Priority Data

May 18, 2018  (EP) .................................... 18305621

(51) Int. Cl.
*H04L 9/40* (2022.01)
*G06F 16/25* (2019.01)
*H04L 67/01* (2022.01)

(52) U.S. Cl.
CPC ........ *H04L 63/0861* (2013.01); *G06F 16/252* (2019.01); *H04L 67/01* (2022.05)

(58) Field of Classification Search
CPC .... H04L 63/0861; H04L 67/42; G06F 16/252
See application file for complete search history.

(56) References Cited

U.S. PATENT DOCUMENTS

| | | | |
|---|---|---|---|
| 9,268,904 B1* | 2/2016 | Harding | G06F 16/212 |
| 11,055,273 B1* | 7/2021 | Meduri | G06F 16/2358 |
| 2004/0010697 A1* | 1/2004 | White | G06F 21/31 |
| | | | 713/186 |
| 2006/0104485 A1* | 5/2006 | Miller | G06V 10/95 |
| | | | 713/186 |
| 2007/0061590 A1* | 3/2007 | Boye | G06F 21/305 |
| | | | 713/186 |
| 2007/0101154 A1* | 5/2007 | Bardsley | H04L 63/0861 |
| | | | 713/186 |
| 2007/0106424 A1* | 5/2007 | Yoo | H04L 63/102 |
| | | | 700/245 |

(Continued)

OTHER PUBLICATIONS

Search Report issued by the European Patent Office for EP18305621.7 dated Jan. 18, 2019.

(Continued)

*Primary Examiner* — Jeong S Park
(74) *Attorney, Agent, or Firm* — Womble Bond Dickinson (US) LLP

(57) ABSTRACT

The present invention relates to a method for performing a biometric function between a client (1) and a server (2), the server (2) being connected to a biometric database and an alphanumeric database, characterized in that the method comprises performing, by a processing unit (11) of the client (1), steps of:
 (a) identifying a sequence of elementary blocks defined by the biometric function, each elementary block performing a given operation on said biometric database and/or said alphanumeric database implemented by a processing unit (21) of the server (2);
 (b) requesting the execution, by the processing unit (21) of the server (2), of the identified sequence of elementary blocks.

10 Claims, 3 Drawing Sheets

(56) References Cited

U.S. PATENT DOCUMENTS

2010/0253471 A1* 10/2010 Abe .................. G06F 21/32
340/5.83

OTHER PUBLICATIONS

E. Otero-Muras, E. Gonzalez-Agulla, J.L. Alba-Castro, C. Garcia-Mateo, O.W. MArquez-Florez, "An open framework for distributed biometric authentication in a web environment", Annales Des Telecommunications, Jan. 2007, vol. 62, Issue 1-2, pp. 177-192.
A.K.B. Halvi, S. Soma, "A robust and secured cloud based distributed biometric system using symmetric key cryptography and Microsoft cognitive API", Proceedings of the IEEE 2017 International Conference on Computing Methodologies and Communication (ICCMC), Jul. 18, 2017, pp. 225-229.
J. Rose, "Biometrics as a Service: the next giant leap?", Biometric Technology Today, vol. 2016, Issue 3, Mar. 2016, pp. 7-9.

* cited by examiner

METHOD FOR PERFORMING A BIOMETRIC FUNCTION BETWEEN A CLIENT AND A SERVER

CROSS-REFERENCE TO RELATED APPLICATIONS

This application claims the benefit of European Patent Application No. 18305621.7 filed May 18, 2018, the disclosure of which is herein incorporated by reference in its entirety.

FIELD OF THE INVENTION

The field of this invention is that of biometrics system.
More particularly, the invention relates to a method for performing a biometric function as a service.

BACKGROUND OF THE INVENTION

A biometric system is a security identification and authentication unit configured to identify or verify the identity of a living person based on a physiological characteristic such as fingerprints, facial images, Iris prints, etc.

Biometric systems are now widely implemented in various kind of devices, including personal and handheld devices such as laptops and smartphones.

Generally, biometric systems have the same software modules repeated in every different implementation. Consequently, customers end up having several system implementations that provide similar functions in multiple platforms. Additionally, each of the aforementioned business implementations have its own database for biometrics (single or multi-modal).

For easing the development and the democratization of biometrics, it would be interesting to allow the usage of biometric functions as a service from any other system implementation, locally or remotely from devices over the network. This would additionally necessitate the data modules (biometric databases) to be consolidated as well into one larger database, accessible from a multi-biometric matcher.

Is known a so-called "Software-as-a-Service" (SaaS) delivery model in which software is centrally and remotely hosted. It is typically accessed by users using a thin client for instance via a web browser.

While SaaS is commonly for most of office productivity software, it is still not usable for biometrics due to their sensitive nature. In particular, with respect to local implementations, SaaS implementations give rise to risks of identity usurpation, data theft, or privacy breach.

There is a consequently need for a new implementation of biometric systems which could be fully agnostic and agile, without impeding security and privacy.

SUMMARY OF THE INVENTION

For these purposes, the present invention provides according to a first aspect a method for performing a biometric function between a client and a server, the server being connected to a biometric database and an alphanumeric database, characterized in that the method comprises performing, by a processing unit of the client, steps of:
(a) identifying a sequence of elementary blocks defined by the biometric function, each elementary block performing a given operation on said biometric database and/or said alphanumeric database implemented by a processing unit of the server;
(b) requesting the execution, by the processing unit of the server, of the identified sequence of elementary blocks.

As it will be explained, this principle allows a complete "Biometrics-as-a-service" functioning.

Preferred but non limiting features of the present invention are as follows:
the method comprises a further step (c) of receiving in response, from the processing unit of the server, a result or an acknowledgment of the execution of the elementary blocks of the identified sequence;
each elementary block is chosen from a predetermined list of elementary blocks;
said predetermined list of elementary blocks comprises:
a biometric template insertion block;
a biometric template deletion block;
a biometric template updating block;
a biometric template matching block;
an alphanumeric matching block;
the biometric function to be processed is chosen among a predetermined list of reference biometric functions, each reference biometric functions being defined as a sequence of elementary blocks;
said predetermined list of reference biometric functions comprises:
an enrolment function;
an inquiry function;
a merging function;
a deletion function.
further:
the sequence of elementary blocks defining the enrolment function comprises the biometric template matching block and the alphanumeric matching block then the biometric template insertion block;
the sequence of elementary blocks defining the inquiry function comprises the biometric template matching block and the alphanumeric matching block;
the sequence of elementary blocks defining the merging function comprises the biometric template updating block;
the sequence of elementary blocks defining deletion function comprises the biometric template deletion block.
some information of the alphanumeric database is masked, the processing unit of the server unmasking said masked information of the alphanumeric database, if a privacy key is provided by the client;
said biometric database is a multi-biometric database.

In a second aspect, the invention provides a client comprising a processing unit configured to implement a method according to the first aspect of the invention for performing a biometric function between the client and a server.

In a third aspect, the invention provides an assembly of the client according to the second aspect of the invention and the server.

According to a fourth and a fifth aspects, the invention provides a computer program product, comprising code instructions for executing a method according to the first aspect for performing a biometric function between the client and a server; and a computer-readable medium, on which is stored a computer program product comprising code instructions for executing a method according to the first aspect for performing a biometric function between the client and a server.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF A PREFERRED EMBODIMENT

Architecture

Figure 1:
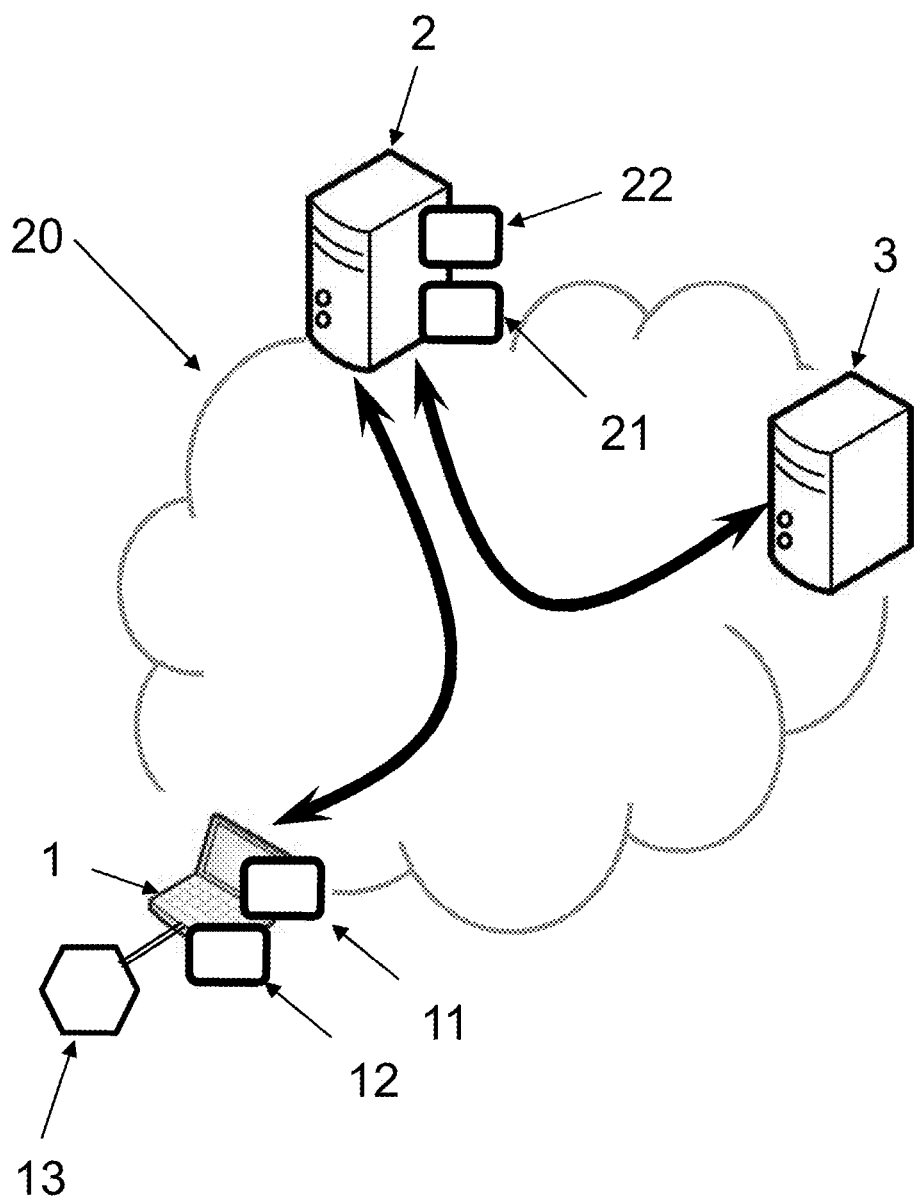
FIG. 1 illustrates an example of architecture in which the method according to the invention is performed.

The present method for performing a biometric function is implemented within an architecture such as illustrated in FIG. 1, wherein a client 1 and a server 2 are connected, in particular through a network 20 such as internet, i.e. the server 2 is a remote server.

The client 1 comprises a processing unit 11 such as a processor, and generally a memory 12 and a biometric acquisition unit 13 (for instance a font camera for face recognition, a fingerprint scanner, etc.). The client 1 could be any kind of user device, such as a mobile terminal (smartphone, tablet, etc.), a PC (laptop), an access controller (gate, kiosk, etc.).

The server 2 is connected to a biometric database and an alphanumeric database, in particular stored on one or more distinct devices 3 (as represented by FIG. 1) for security reasons. It is to be understood that the client is not directly connected to these databases, i.e. has to rely on the server for accessing them.

The server 2 also comprises a processing unit 21 such as a processor, and generally a memory 22, which can itself comprise a mass memory (for instance a HDD) and a fast-access memory (in particular RAM—Random Access Memory).

By biometric database it is meant a database storing the biometric templates associated to users, i.e. the digital references of distinct characteristics that have been extracted from a biometric sample. In other words a biometric template is a data representative of a biometric sample, for example an image of a fingerprint pattern. The templates may be referenced using a "unique identifier", i.e. a user profile number.

The biometric database is preferably a "multi-biometric" database (also called multimodal) storing biometric templates from several modalities, i.e. biometry types, for instance face, iris and fingerprints from several fingers.

By alphanumeric database it is meant a database storing the alphanumeric information associated to user profiles, i.e. such as their name, address, age, etc. This information is preferably that of an official (in particular governmental) identity document such as a passport, an ID card, etc. Again, the information may be referenced using a "unique identifier", i.e. a user profile number.

To sum up, each user profile is defined by alphanumeric information associated to the profile in the alphanumeric database, and one or more biometric templates in a (possibly multimodal) biometric database.

A server 2 connected to a multimodal database is referred to as "Multi-Biometric Sub System" (MBSS). The server 2 can host a working copy of the biometric database (on its memory 22, in particular on the fast-access memory). Such copy may be temporary, so as to perform faster operations on biometric data, while keeping the device 3 as the original copy. For best practice and privacy reasons, it is preferred to keep the alphanumeric database only on the device 3.

Method for Performing a Biometric Function

In a first aspect, there is proposed such a method, involving both of the client 1 and the server 2.

Such method proposes to solve the above-mentioned problems by defining on the first hand a list of modular high-level functions in biometric system (called reference biometric functions) which are to be used in every business implementation (i.e. for every client 1), and on the other hand a list of services building blocks (called elementary blocks) each performing a given operation on said biometric database and/or said alphanumeric database, any reference biometric function being "breakable down" into these elementary blocks.

In other words, each reference biometric function could be defined in a unique way as a sequence of elementary blocks, in other words each reference biometric function is "mapped" to a combination of elementary blocks.

Thus, a multi-user, multi-application, agnostic access to the exposed elementary services through the network 20 from any client 1, achieving a "biometric-as-a-service" functionality, can be obtained by having:
  the elementary blocks being implemented only by the processing unit 21 of the server 2 (in particular for every biometric modality), and;
  the reference biometric functions being implemented only by the processing unit 11 of each client 1, in particular as light "templates" (in other words "skeletons") built as sequence of calls for elementary blocks.

Therefore, the platform specific implementation is limited to these light templates of all the reference biometric function, the implementation of the core elementary blocks having only to be done at the server 2, once for every client 1.

The MBSS 2 thus can be used as a biometric engine between the biometric functions and databases to perform the complete biometric matching.

And as the elementary blocks are "standalone" blocks performing a given operation on said biometric database and/or said alphanumeric database, there is no security breach created as the internal states of the elementary block will stay inaccessible from the outside of the server 2.

Figure 2:
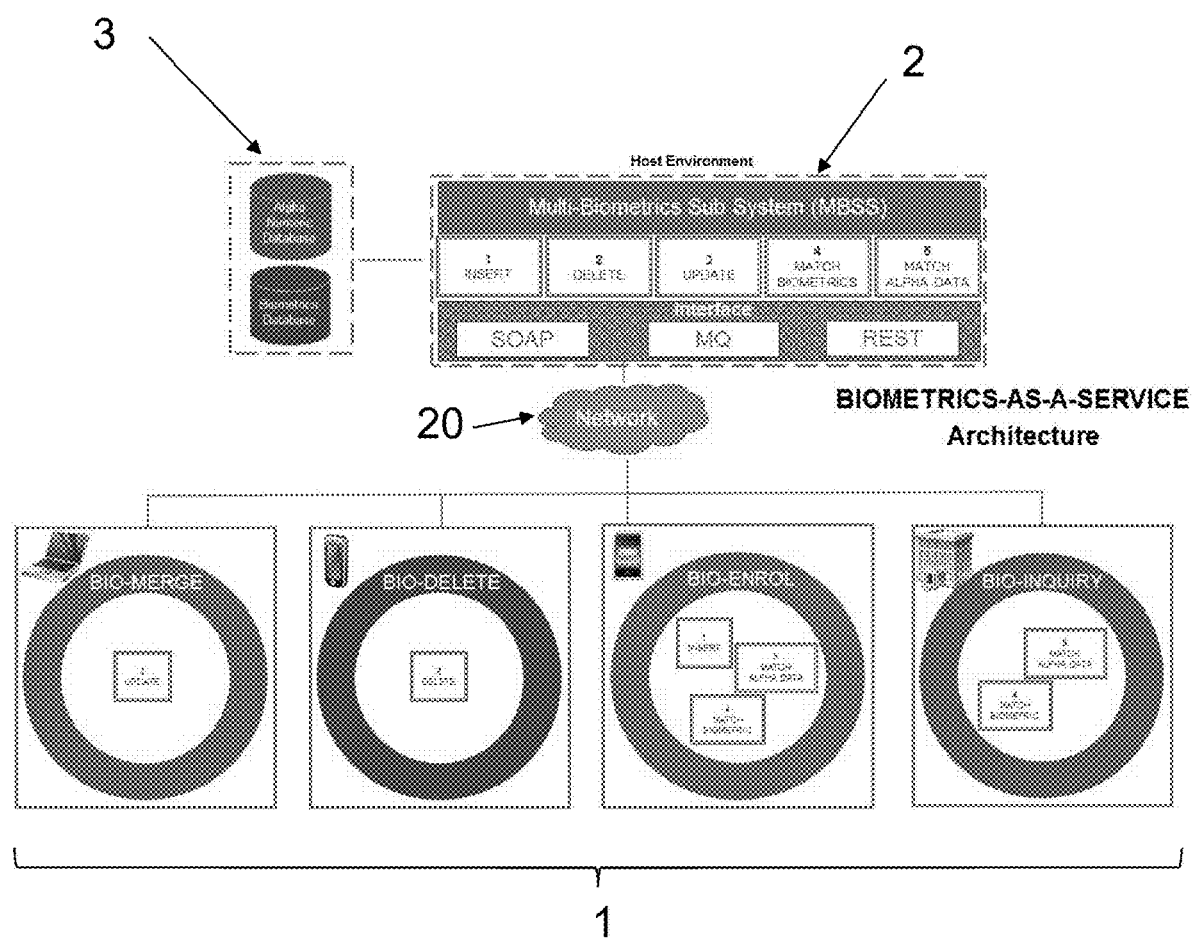
FIG. 2 represents the logical architecture of the server and the client according to a preferred embodiment.
Figure 3:
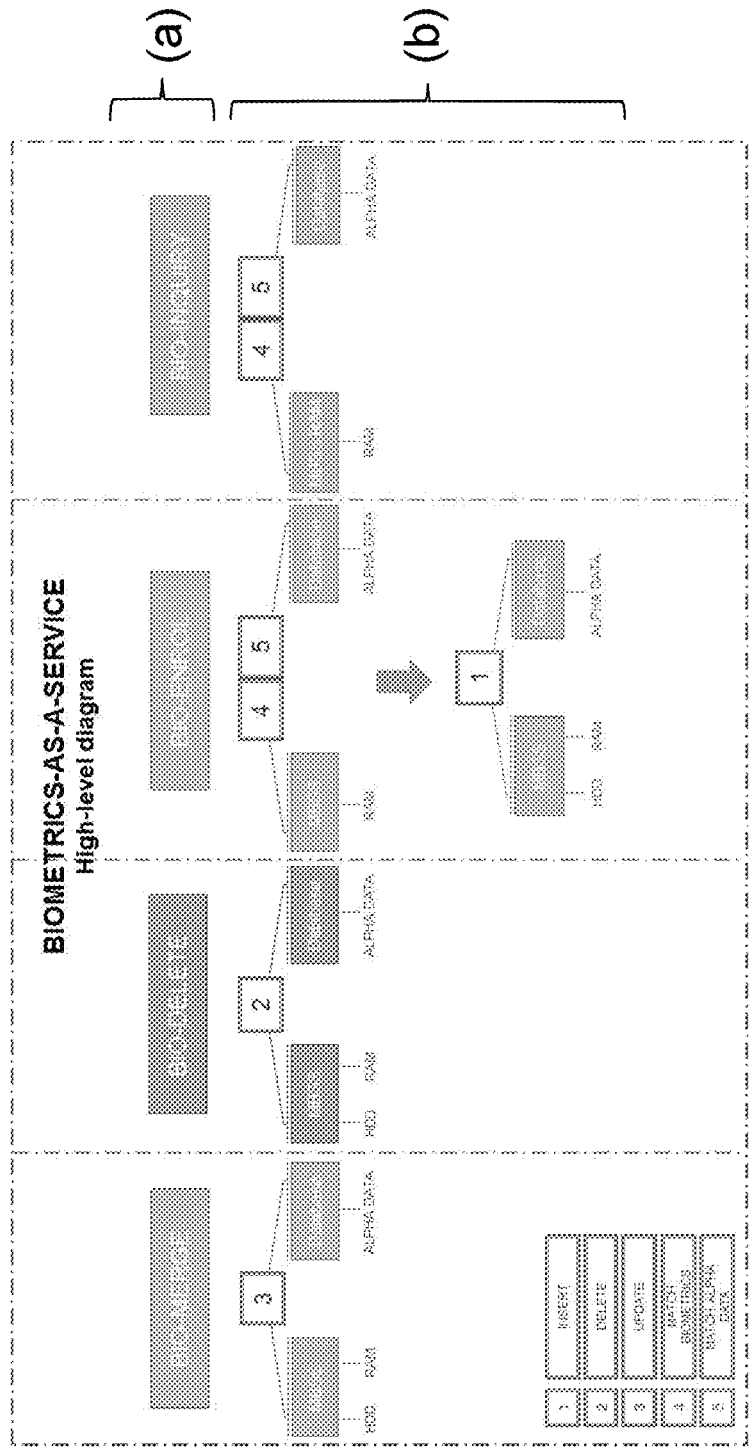
FIG. 3 represents examples of sequences of elementary blocks defining reference biometric functions.

FIG. 2 represents an example of architecture with four reference functions and five elementary blocks, and FIG. 3 represents the sequence of elementary blocks for each the four reference functions in this example, as it will be described below.

In a first step (a), the processing unit 11 of the client 1 identifies the sequence of elementary blocks defined by the biometric function to be performed (the function inputted whose execution is requested).

Preferably, as explained the client 1 is provided with a predetermined list of reference biometric functions (for example stored in the memory 12), each reference biometric function being defined as a sequence of elementary blocks among a predetermined list of elementary blocks implemented by the processing unit 21 of the server 2.

In step (a), the processing unit 11 thus preferably identifies the biometric function to be performed as one of the reference biometric functions of the list, and retrieves the sequence of elementary blocks associated with.

In a further step (b), the processing unit 11 of the client requests the execution, by the processing unit 21 of the server 2, of the identified sequence of elementary blocks. To this end a plurality of messages can be sent from the client 1 to the server 2, the messages identifying the elementary blocks whose execution is required.

The messages can be pursuant to a service-oriented protocol such as XML/SOAP ("Simple Object Access Protocol"), REST, MQ, etc. The server 2 may be provided with one or more queues, i.e. dedicated components able to receive the messages of a protocol (in the example of FIG. 2, there are three queues respectively for XML/SOAP, REST and MQ messages) and to temporary store them until the processing unit 21 of the server can process it (using the FIFO principle). In other words, they are interface for different client types.

The queues act as waiting buffers in case of a large number of simultaneous requests: the processing of each request may be delayed, but is ultimately guaranteed.

In an advantageous further step (c), the processing unit 11 of the client receives in response, from the processing unit 21 of the server 2, a result or an acknowledgment of the execution of the elementary blocks of the identified sequence.

It is understood that steps (b) and (c) might be repeatedly performed according to the sequence of elementary blocks defined:
- in a first occurrence of the step (b), the execution of the first block of the sequence is requested, then in a first occurrence of the step (c), the result of this execution is received;
- in a second occurrence of the step (b), the execution of the second block of the sequence is requested (using possibly the result of the first execution), then in a second occurrence of the step (c), the result of this execution is received;
- etc. until the whole sequence of blocks is executed.

Lists of Reference Functions and Elementary Blocks

As already explained, each elementary block may be chosen from a predetermined list of elementary blocks, and/or each reference function may be chosen from a predetermined list of reference functions.

In a preferred embodiment, said predetermined list of reference biometric functions comprises:
- an enrolment function (named BIO-ENROL in FIGS. 2 and 3);
- an inquiry function (named BIO-INQUIRY in FIGS. 2 and 3);
- a merging function (named BIO-MERGE in FIGS. 2 and 3);
- a deletion function (named BIO-DELETE in FIGS. 2 and 3).

The enrollment function creates and inserts a new unique user profile in the system.

The inquiry function identifies the existence of a record in the system (in particular to authenticate a user based on a fresh biometric template, in particular acquired at the client 1).

The merge function modifies existing biometrics and data records according to new information, it is often called "renew" (for instance, users shall periodically—for instance each ten years for ID cards—record a new biometric template in case their body have slightly changed. Consequently, the user profile is the same, but the alphanumeric and/or biometric data is modified).

The delete function remove a complete user profile from the system.

Alternatively, or in addition, in a preferred embodiment, said predetermined list of elementary blocks comprises:
- a biometric template insertion block (number 1 in FIGS. 2 and 3);
- a biometric template deletion block (number 2 in FIGS. 2 and 3);
- a biometric template updating block (number 3 in FIGS. 2 and 3);
- a biometric template matching block (number 4 in FIGS. 2 and 3);
- an alphanumeric matching block (number 5 in FIGS. 2 and 3).

The biometric template insertion block adds a user profile in the system, i.e. creates new corresponding entries in each of the biometric databases and the alphanumeric database.

The biometric template deletion block removes a user profile from the system, i.e. delete the corresponding entries in each of the biometric databases and the alphanumeric database.

The biometric template updating block modifies for a given user profile a biometric template in the biometric database and/or an alphanumeric information in the alphanumeric database.

The biometric template matching block searches for a given biometric template in the biometric database.

The alphanumeric matching block searches for a given alphanumeric information in the alphanumeric database.

If combining both embodiment, the sequences can be the following ones:
- the sequence of elementary blocks defining the enrolment function comprises the biometric template matching block and the alphanumeric matching block and then the biometric template insertion block. In other words, the client checks that the user is not already present in at least one of the database (by trying to match his biometric template and his alphanumeric information), and if there are no match, the biometric template insertion block is performed for creating the new profile.
- the sequence of elementary blocks defining the inquiry function comprises the biometric template matching block and the alphanumeric matching block. Indeed, a candidate biometric template and a candidate alphanumeric information are searched for in each database, and there is a positive result if there and found associated to the same profile.
- the sequence of elementary blocks defining the merging function comprises the biometric template updating block. Merge is generally performed after inquiry, the profile to be modified is known and the new biometric template or alphanumeric information can be directly send to the server 2.
- the sequence of elementary blocks defining deletion function comprises the biometric template deletion block.

Further Improvements

In addition to the usual security concerns and countermeasures needed to protect sensitive systems, data privacy and protection may have a further special attention for implementation.

In particular it may be requested that "high-profile" people (for instance leaders, royalties, etc.) have their alphanumeric data completely masked.

It means that whenever a biometric inquiry is requested from the system, the corresponding text data had to be masked unless the inquiry owner had the proper access control settings.

Consequent, are advantageously provided privacy keys such as ACL ("access control list") keys to the users of the Biometrics-as-a-Service that defines each authorization for data access. These keys will be specified as masks in an ICD ("Interface control document") document provided to customers/integrators.

Computer Program Product

In a second aspect, is provided a client 1 implementing the method according to the first aspect for performing a biometric function between a client 1 and a server 2.

The processing unit 11 of the client 1 is configured to:
(a) identify a sequence of elementary blocks defined by the biometric function, each elementary block performing a given operation on said biometric database and/or said alphanumeric database implemented by a processing unit 21 of the server 2;
(b) request the execution, by the processing unit 21 of the server 2, of the identified sequence of elementary blocks.

In a third aspect, is provided an assembly of (at least one) client 1 according to the second aspect and the server 2, connected (in particular through a network 20); for performing between the m a biometric function "as a service".

The processing unit 21 of the server 2 is configured to execute elementary blocks when requested by a client 1.

Computer Program Product

In a fourth and fifth aspect, the invention concerns a computer program product comprising code instructions to execute a method (particularly on the data processing unit 11, 21 of the client 1 and/or the server 2) according to the first aspect of the invention for performing a biometric function between a client 1 and a server 2, and storage means readable by computer equipment (memories 12, 22 of the client 1 and/or the server 2) provided with this computer program product.

The invention claimed is:

1. A method for performing a biometric function between a client and a server, the server being connected to a biometric database and an alphanumeric database, characterized in that the method comprises performing, by a processing unit of the client, steps of:
(a) identifying a sequence of elementary blocks defined by the biometric function, each elementary block performing a given operation on said biometric database and/or said alphanumeric database implemented by a processing unit of the server and
(b) requesting the execution, by the processing unit of the server, of the identified sequence of elementary blocks, wherein
a sequence of elementary blocks defining an enrolment function comprises a biometric template matching block and an alphanumeric matching block then a biometric template insertion block,
a sequence of elementary blocks defining an inquiry function comprises the biometric template matching block and the alphanumeric matching block,
a sequence of elementary blocks defining a merging function comprises a biometric template updating block, and
a sequence of elementary blocks defining a deletion function comprises a biometric template deletion block.

2. The method according to claim 1, comprising a further step (c) of receiving in response, from the processing unit of the server, a result or an acknowledgment of the execution of the elementary blocks of the identified sequence.

3. The method according to claim 1, wherein each said elementary block is chosen from a predetermined list of elementary blocks.

4. The method according to claim 3, wherein said predetermined list of elementary blocks comprises:
the biometric template insertion block,
the biometric template deletion block,
the biometric template updating block,
the biometric template matching block, and
the alphanumeric matching block.

5. The method according to claim 1, wherein the biometric function to be processed is chosen among a predetermined list of reference biometric functions, each said reference biometric function being defined as a sequence of elementary blocks.

6. The method according to claim 5, wherein said predetermined list of reference biometric functions comprises:
the enrolment function,
the inquiry function,
the merging function, and
the deletion function.

7. The method according to claim 1, wherein some information of the alphanumeric database is masked, the processing unit of the server unmasking said masked information of the alphanumeric database only if a corresponding privacy key is provided by the client.

8. The method according to claim 1, wherein said biometric database is a multi-biometric database.

9. A client comprising a processing unit configured to implement the method according to claim 1 for performing a biometric function between the client and a server.

10. A non-transitory computer program product comprising code instructions to execute the method according to claim 1 for performing a biometric function between the client and a server, when said program is executed on a computer.

* * * * *